United States Patent [19]
Watson et al.

[11] 3,816,268

[45] June 11, 1974

[54] STABILIZED DISTILLATION OF PENTACHLOROPHENOL

[75] Inventors: William David Watson; Erwin H. Kobel, both of Midland, Mich.

[73] Assignee: The Dow Chemical Company, Midland, Mich.

[22] Filed: Apr. 20, 1973

[21] Appl. No.: 353,195

[52] U.S. Cl.................... 203/38, 203/59, 203/95, 260/623 R
[51] Int. Cl............................................. C07c 39/24
[58] Field of Search....... 260/623 R; 203/59, 95–97, 203/38, 29, 6, 7

[56] References Cited
UNITED STATES PATENTS 3,646,225   2/1972   Mornson........................ 260/623 R
3,686,337   8/1972   Chang............................ 260/623 R

OTHER PUBLICATIONS

Biltz et al.; Berichte 37, pg. 3017, 4018 (1904). 4017,

*Primary Examiner*—Wilbur L. Bascomb, Jr.
*Attorney, Agent, or Firm*—David H. Thurston

[57] ABSTRACT

Purified pentachlorophenol is recovered in good yield by distilling the commercially available grade in the presence of a high boiling amine or alkanolamine under reduced pressure and preferably after the starting pentachlorophenol has been exposed to moisture. The purified product is nearly colorless and non-blooming and it is essentially free of polychlorinated dibenzo-p-dioxins and phenoxy-phenols.

5 Claims, No Drawings

STABILIZED DISTILLATION OF PENTACHLOROPHENOL

BACKGROUND OF THE INVENTION

This invention relates to an improved method whereby pentachlorophenol can be purified by distillation with high recovery and minimal decomposition and side reactions. A product which is essentially free of undesirable impurities and unsatisfactory physical properties is thereby obtained.

Pentachlorophenol is a well known and widely used fungicide and preservative which is particularly useful for preserving wood exposed to attack by the elements. Commercially available pentachlorophenol in the past has been a relatively dark colored solid sold in the form of flakes and prills or beads. This material has an annoying characteristic of blooming or subliming to form a surface layer of easily dislodged fine crystalline dust which is intensely irritating to skin and mucous membranes. The dark color is caused by high molecular weight tarry impurities and is of itself no particular disadvantage for many uses such as the protection from rot of posts and poles designed for sinking in the ground. However, the color is disadvantageous for other uses, for example wood used in outdoor furniture, porches, and decks. Of perhaps more serious consequence is the recent discovery of the toxic properties of polychlorinated dibenzo-p-dioxins which fortunately constitute a relatively small proportion of the high molecular weight impurities. It has also been found that other polychlorinated polynuclear impurities, the chlorinated phenoxyphenols, are a primary cause of blooming of impure pentachlorophenol.

Impurities such as these can be removed by recrystallization, but this process is usually too expensive and slow for use with a bulk chemical. An obvious means for getting rid of high boiling impurities is distillation and pentachlorophenol has been distilled to purify it, see Biltz et al., Berichte 37, 4018 (1904). However, pentachlorophenol is not completely stable at elevated temperatures and it tends to decompose and undergo side reactions to some extent during distillation to form large volumes of HCl and tar. Small amounts of aluminum and iron chlorides present in commercial material accelerate these reaction. Exposure of the material to water deactivates these metal chlorides but an undesirable degree of decomposition and side reaction persists at distillation temperatures.

SUMMARY OF THE INVENTION

It has now been found that pentachlorophenol is stabilized and decomposition during distillation is effectively inhibited by the presence of one or more amines stable at the distillation temperature and preferably having a boiling point at atmospheric pressure of at least about 170°C. Suitable amines are hydrocarbon amines, aromatic, aliphatic, or cycloaliphatic in nature, and alkanolamines. The distillation is carried out at subatmospheric pressure, preferably below about 100 mm. Hg.

DETAILED DESCRIPTION

Somewhat better results are obtained when any polyvalent metal halides present in the impure material are deactivated by exposure of the pentachlorophenol to moisture before or during the distillation. This may be accomplished by contacting the pentachlorophenol with a small amount of liquid water, for example, about 0.05–5 percent by weight. Other convenient methods can be used as well, such as contact with steam or even by exposure to humid air. Any significant quantity of water has some deactivating effect but at least 3 moles of water per mole of iron and aluminum chlorides is needed for complete deactivation of these compounds. More can be used but is unnecessary.

A suitable quantity of amine is about 0.05–2 percent by weight. These figures represent practical limits rather than critical amounts. Any significant amount provides some stabilizing effect. Preferably, no more than one percent of amine is used. Larger amounts actually begin to show a deleterious effect. Examples of commonly available amines which are useful in the practice of the present invention include aniline, toluidine, methylene-dianiline, diphenylamine, dicyclohexylamine, ethanolamine, diethanolamine, triisopropanolamine, triethanolamine, aminoethylethanolamine, triethylenetetramine, triethylenediamine, and similar compounds. Particularly preferred amines have a boiling point above that of pentachlorophenol so they remain in the pot and continue to exert their stabilizing effect throughout the distillation.

For reasons of convenience and avoidance of significant decomposition even in the presence of an amine, the distillation is carried out at subatmospheric pressure, preferably below 100 mm. Hg absolute, and most preferably at an absolute pressure sufficiently low to keep the distillation head temperature below about 230°C., i.e., a pressure below about 80 mm. Hg, but sufficiently high to avoid freezing of the pentachlorophenol in the head.

The distilled product is typically a light yellow crystalline solid having little or no tendency to bloom. When it is converted to a granular form such as flakes or beads, it remains free flowing and essentially unchanged in appearance even after long storage.

EXAMPLES 1–8

Samples of 500 g. technical grade pentachlorophenol prills with or without amine additive as noted were distilled at 75 mm. Hg absolute pressure through a distillation column packed with stainless steel column packing in about one hour of distillation time to a final pot temperature of about 280°C. except as noted. The residue remaining in the distillation pot was then held at the final pot temperature for an additional four hours to simulate recycling of tars through a heat exchanger in a commercial distillation unit. The HCl evolved during the distillation and during the hold period was monitored by scrubbing the vent gas through a known quantity of 1N NaOH and titrating with 1N HCl. The results are listed in the table along with those of various control experiments run for purpose of comparison. The products obtained by distillation in the presence of an amine were typically about 90–95 percent pentachlorophenol with the remainder consisting essentially of tetrachlorophenol. Only trace amounts if any of polychlorinated phenoxyphenol and polychloro dibenzo-p-dioxin were present. Products from the control distillations contained increased amounts of these two impurities in rough proportion to the HCl liberated during distillation.

TABLE 1

| Example No. | Additive | Wt. % Recovery Distillate | Residue | Millimoles HCl Evolved During Distillation | At 280–300°C. |
|---|---|---|---|---|---|
| Control | none | 84.7 | 13.8 | 113.7 | 40.7 |
| Control | water* | 93.3 | 6.0 | 11.6 | 34.2 |
| 1 | 0.9 g. triethanolamine | 93.5 | 5.6 | 0.2 | 2.0 |
| 2 | (1)0.46 g. triethanolamine + water* | 90.7 | 9.0 | 0.8 | 3.8 |
| 3 | 0.46 g. triethanolamine + water* | 95.3 | 4.6 | 0.9 | 5.9 |
| 4 | 0.9 g. diphenylamine | 93.1 | 6.4 | 0.4 | 14.7 |
| 5 | 0.46 g. diphenylamine + water* | 94.5 | 5.2 | 0.3 | 1.3 |
| 6 | 1.9 g. aniline + water* | 95.7 | 4.5 | 0.7 | 4.8 |
| 7 | 0.46 g. tetraethylenepentamine + water* | 95.0 | 4.4 | 1.2 | 6.2 |
| 8 | 0.46 triphenylamine + water* | 94.0 | 5.1 | 3.7 | 24.9 |

*water was added by blowing moist air through the prills for 10–15 minutes.
(1) distilled to a pot temperature of 250°C.

EXAMPLE 9

To demonstrate the effect of varying the concentration of amine, 500 g. portions of technical pentachlorophenol prills which had been blown with moist air as before were combined with different quantities of triethanolamine and distilled as described in the foregoing examples. The residue holding time was four hours at 250°C. Results are listed in Table 2.

Table 2

| Amine, g. | Wt. % Recovery Distillate | Residue | Millimoles HCl Evolved Distillation | At 250°C. |
|---|---|---|---|---|
| 1.88 | 86.6 | 11.5 | 3.4 | 13.1 |
| 0.93 | 89.7 | 9.8 | 1.7 | 6.5 |
| 0.46 | 90.7 | 9.0 | 0.8 | 3.8 |

Results closely similar to those set forth in the above examples are obtained when the amine component is replaced by one or a mixture of two or more other amines as previously defined and named. Distillation at a pressure lower than that used in the examples somewhat reduces the quantity of HCl evolved in each case.

We claim:

1. A process for purifying impure pentachlorophenol which comprises distilling said pentachlorophenol at subatmospheric pressure in the presence of at least about 0.05 percent by weight by weight of said impure pentachlorophenol of at least one amine stable at the distillation temperature, wherein said amine is a hydrocarbon amine or an alkanolamine, thereby separating purified pentachlorophenol from higher boiling impurities.

2. The process of claim 1 wherein about 0.05–2 percent by weight of amine is present in the distillation mixture.

3. The process of claim 1 wherein the amine has a boiling point at atmospheric pressure of at least about 170°C.

4. The process of claim 1 wherein the impure pentachlorophenol is contacted with water.

5. The process of claim 1 wherein the distillation pressure is below 100 mm. Hg absolute.

* * * * *

PO-1050
(5/69)

UNITED STATES PATENT OFFICE
CERTIFICATE OF CORRECTION

Patent No. 3,816,268            Dated June 11, 1974

Inventor(s) William D. Watson, Erwin H. Kobel

It is certified that error appears in the above-identified patent and that said Letters Patent are hereby corrected as shown below:

Col. 1, line 46, delete "reaction" and insert --reactions--.

Col. 4, line 30, first occurrence, delete "by weight".

Signed and sealed this 19th day of November 1974.

(SEAL)
Attest:

McCOY M. GIBSON JR.
Attesting Officer

C. MARSHALL DANN
Commissioner of Patents